Oct. 27, 1970     D. L. BOOS     3,536,963

ELECTROLYTIC CAPACITOR HAVING CARBON PASTE ELECTRODES

Filed May 29, 1968

INVENTOR.
DONALD L. BOOS

BY *Leland L. Chapman*

ATTORNEY

United States Patent Office 3,536,963
Patented Oct. 27, 1970

3,536,963
ELECTROLYTIC CAPACITOR HAVING CARBON PASTE ELECTRODES
Donald L. Boos, Garfield Heights, Ohio, assignor to The Standard Oil Company, Cleveland, Ohio, a corporation of Ohio
Filed May 29, 1968, Ser. No. 733,120
Int. Cl. H01g 9/00
U.S. Cl. 317—230                   16 Claims

ABSTRACT OF THE DISCLOSURE

A high capacitance, low voltage electrolytic capacitor consisting of at least one pair of electronically separated carbon paste electrodes. The unique feature of this invention resides in the carbon paste electrodes which are made by mixing activated carbon particles with an electrolyte to form a paste and then compressing this paste to form the electrodes. The activated carbon particles have a surface area in the preferred range of 500–1500 meters $^2$/g.

---

There are two commercial types of electrolytic capacitor: aluminum and tantalum. Aluminum electrolytics provide the greatest capacity per dollar and are produced with capacity ratings from a few microfarads at several hundred volts to a farad at 1.5 volts. They are generally used in the filter sections of power supplies, in audio-frequency bypass applications, and in audio coupling where D.C. isolation is needed. Because of their low price, aluminum electrolytics are used extensively in radio and television circuits.

Tantalum capacitors exhibit higher values of capacity per unit volume than aluminum types, but they are more expensive per microfarad and are produced with ratings up to about 600 microfarads. In addition to being smaller per unit capacity, they are also more reliable than aluminum electrolytics. This is especially true of the dry-solid tantalum type, which is used largely in military electronics and computers, as well as in some television circuits.

The present invention relates to a miniaturized, high capacitance, low voltage electrolytic carbon paste electrode capacitor. This capacitor consists of at least one pair of carbon paste electrodes, a separator which functions as an electronic insulator and an ionic conductor. The novel feature of the capacitor resides in the carbon paste electrode structure. The electrodes are manufactured by mixing finely divided carbon particles with an electrolyte to form a paste, and then subsequently compressing the paste to form the electrodes.

Applications for the carbon paste electrode capacitor generally fall into two classifications: replacement of conventional electrolytic capacitors and applications where an extremely high capacitance is required, such as supplying D.C. power pulses in flashing warning lights, supplying D.C. power at lower rates for longer periods such as short-term high beam for hand lights and motorized toys, aircraft engine starters, pulsed radio transmitters, etc. This capacitor is particularly suitable for computer power supplies because the logic circuits in digital computers require high amperage and low voltage direct current. With respect to many AC applications, the product of impedance measured at 120 c.p.s. and the volume of the total capacitor package in cubic inches divided by voltage squared ($ZV/E^2$) should be minimized to save space. The merit factor, $ZV/E^2$, can be effectively used as an index of competitiveness of the carbon paste electrode capacitor and the aluminum electrolytic capacitors in a particular voltage range. For example, a carbon paste electrode capacitor exhibiting a merit factor of 0.0015 is competitive with aluminum electrolytics in the voltage range of up to about 30 volts. This means that at voltages below 30 volts, the carbon paste electrode will be smaller than an aluminum electrolytic capacitor for a given impedance at a frequency of 120 c.p.s. Since impedance of the carbon paste electrode capacitor is frequency independent in the range of 500–50,000 c.p.s. and decreases in the range of 0.5–500 c.p.s., and since impedance of the aluminum electrolytics increases at higher frequency, it becomes apparent that at higher frequency, the paste capacitor will be competitive with the aluminum electrolytics over a greater voltage range and therefore will possess a merit factor which would be less than 0.0015. It is therefore desirable to construct carbon paste electrodes exhibiting low merit factors. Initial indications are that merit factors of less than 0.0005 are attainable.

The paste electrode capacitor possesses several important advantages over the capacitors disclosed by the closest prior art known. Whereas the U.S. Patent No. 2,800,616 to Becker alleges a capacitance of up to 10 farads per cubic inch of the submerged porous carbon when charged to 1.5 volts D.C., the carbon paste electrode capacitor of the present invention has a capacitance of about 430 farads per cubic inch of the active volume of the electrode or about 200 farads per cubic inch of total capacitor volume at substantially the same voltage level. Whereas the electrodes of the capacitors disclosed in Pat. No. 2,800,616 and No. 3,288,641 are solid, porous structures subject to cracking and breaking, the carbon paste electrodes of the present invention are flexible enough to resist cracking and breaking. Whereas the carbon electrodes of the prior art are limited to certain minimum dimensions because of inherent brittleness, the paste electrodes are not so limited, and can be manufactured in miniature size. Whereas the minimum thickness of the prior art electrodes is limited by the fragile nature of the material, the thickness of the paste electrode is not so limited—the carbon paste electrode can be deposited on a support surface as a very thin film by known techniques, such as spraying or roll coating. Since electronic resistance is directly proportional to the thickness of an electrode, reducing the thickness of an electrode would produce a concomitant reduction in electronic resistance as well as reduction of the re-equilibration charge on interruption of the discharge current.

Referring now to the drawing, FIG. 1 depicts a single-cell electrolytic capacitor consisting of a pair of identical electrode assemblies 10, 11. Each electrode subassembly consists of an electric conducting and ionic insulating member 12 which can be made of, for example, carbon, lead, iron nickel tantalum or any impervious conducting material. Member 12 is characterized by its electrical conducting property and its chemical inertness to the particular electrolyte employed at the potential impressed upon it. Its primary functions are as a current collector and an inter-cell ionic insulator. If the particular electronic and ionic insulating member is susceptible to corrosion by the electrolyte or is not completely impervious, thus permitting the electrolyte to seep through and corrode adjoining components, the surfaces of the member can be provided with a coating of a noble metal or a substance such as colloidal graphite in a solvent such as alcohol, to minimize such problems. This procedure is also effective in reducing leakage currents by better than a factor of 10.

Annular means or gasket 14 is preferably cemented or in some manner affixed to conducting member 12. Since electrode 13 is not a rigid mass but is to some extent flexible, the principal function of gasket 14 is to confine electrode 13 and prevent the mass of the electrode material from creeping out. Gasket material is preferably an insulator, although it need not necessarily be that. It should be flexible to accommodate expansion and contraction of the electrode. Other obvious ways of confining the electrode would be apparent to those skilled in the art.

Separator 15 is generally made of a highly porous material which functions as an electronic insulator between the electrodes yet affording free and unobstructed movement to the ions in the electrolyte. The pores of the separator 15 must be small enough to prevent carbon-to-carbon contact between the opposing electrodes, since such a condition would result in a short circuit and consequent rapid depletion of the charges accumulated on the electrodes. The separator can also be a nonporous ion-conducting material, such as the ion exchange membranes. Of the numerous ion exchange membranes, polyzirconium phosphate is of particular significance. Any conventional battery separator should be suitable, and materials such as porous polyvinyl chloride, glass fiber filter paper, cellulose acetate, mixed esters of cellulose, and Fiberglas cloth have been tried and were found to be useful. Prior to its use the separator is saturated with electrolyte. This can be accomplished by soaking the separator in the electrolyte for about 15 minutes or less. A surfactant, such as a photographic wetting agent, may be added to the electrolyte for the purpose of facilitating wetting the separator. Surfactants also promote wetting of the carbon material. Photographic wetting agent seems to be effective only with neutral electrolytes.

Carbon electrode 13 consists of activated carbon particles and an electrolyte held captive thereby. Activation of the carbon is the process by means of which greatly improved adsorption properties and surface area are imparted to a naturally occurring carbonaceous material. Because electrical energy storage of a capacitor is apparently based on surface area, an increase in energy storage can be expected from an increase in surface area, as by activation.

Active carbon, which is utilized in the preparation of the carbon paste electrodes, has surface area in the range of 100–2000 meters$^2$/g., and preferably in the range of 500–1500 meters$^2$/g. as measured by the Brunauer-Emmet-Teller method. The surface area is mainly internal and may be generated by numerous activation methods, some of which are hereafter discussed. In general, active carbon contains upward of 80 percent carbon, as well as hydrogen, nitrogen, oxygen, sulfur and inorganic salts that leave an ash combustion. It is a sequiture that the pores in the activated carbon material must be large enough to permit electrolyte penetration.

The initial stage in the preparation of an active carbon is carbonization or charring of the raw material, usually conducted in the absence of air below 600° C. Just about any carbon-containing substance can be charred. After the source material is charred, the second step is activation. The method used most extensively to increase the activity of carbonized material is controlled oxidation of a charge by suitable oxidizing gases at elevated temperatures. Most of the present commercial processes involve steam or carbon dioxide activation between 800° C. and 1000 C., or air oxidation between 300° C. and 600° C. Alternately, gases such as chlorine, sulfur dioxide and phosphorous may also be used. The time required for activation varies from 30 minutes to 24 hours, depending on the oxidizing conditions and the quality of active carbon desired. Inhibitors or accelerators can be mixed with the carbon to develop the increased activity. Other activation methods include activation with metallic chlorides and electrochemical activation. The latter is a process whereby capacity of an electrode can be increased by electrochemical cycling. For example, a capacitor using a pair of solid carbon electrodes experienced an increase in capacity from 145.5 f. to 154.5 f. after 3000 cycles.

Another general method of activation is the dolomite process. Substances such as dolomite, sulphates and phosphoric acid are mixed with the carbon. On activation, the material continuously releases a uniform distribution of oxidizing gases to the carbon surface.

Some of the activated carbon is made from hard and dense material. This material is usually carbonized, crushed to size, and activated directly to give hard and dense granules of carbon. In other cases, it is advantageous to grind the charcoal, coal, or coke to a powder, form it into briquettes or pellets with a tar or pitch binder, crush to size, calcine to 500–700° C., and then activate with steam or flue gas at 850–950° C. The latter procedure gives particles with a tailor-made structure which are easier to activate because they possess more entry channels or macro pores for the oxidizing gases to enter and the reaction products to leave the center of the particles.

In preparation of a carbon paste electrode, activated carbon, in the form of powder or fine particles, is mixed with an electrolyte to form a thick slurry. The use of coarse carbon particles should be avoided since the jagged feature of the coarse particles would penetrate the separator and establish carbon-to-carbon contact between the opposing electrodes, thus causing a short. Water or other diluent can be used to facilitate preparation of the slurry. After the slurry is formed and the carbon and the electrolyte are well dispersed, excess water or diluent is extracted by conventional means, leaving a viscous paste. An electrode pellet is formed from the paste by placing a batch of the paste under a ram and applying a predetermined pressure. Upon application of pressure, some liquid will generally exude from the paste.

The electrolyte should consist of a highly conductive medium such as an aqueous solution of an acid, salt, or a base. Examples of suitable aqueous electrolytes are: ammonium chloride, sodium chloride, calcium chloride, potassium chloride, potassium carbonate, sulfuric acid, fluoroboric acid, sodium hydroxide, potassium hydroxide, etc. In applications wherein conductivity of an electrolyte determines its selectivity, 30 percent sulfuric acid and 32 percent fluoroboric acid were found to be especially desirable.

Nonaqueous electrolytes can also be used. Candidate solutes are metal salts of organic and inorganic acids, ammonium and quaternary ammonium salts, etc. Candidate solvents are nitriles such as acetonitrile, propionitrile; sulfoxides such as dimethyl-, diethyl-, ethyl methyl-, and benzylmethyl sulfoxide; amides such as dimethyl formamide; pyrrolidones such as N-methylpyrrolidone; and carbonates such as propylene carbonate. Raymond Jasinski's book entitled "High Energy Batteries" and publications of the Proceedings of Nineteenth and Twentieth Annual Power Sources Conference disclose other candidate nonaqueous electrolytes.

The electrolyte in the electrode structure serves three functions: (1) as a promoter of ion conductivity, (2) as a source of ions, and (3) as a binder for the carbon particles. Sufficient electrolyte should be used to accommodate these functions. A separate binder can be used to perform electrolyte's binder function, however, the binder would add an element of resistance which is undesirable.

The pressure applied to form the electrodes is dependent on many variables such as dimensions of the electrode, particle size of the carbon material, particular electrolyte used, etc. It should be limited to a figure which would leave an amount of electrolyte within the electrode structure sufficient to accomplish its three functions referred to above. Experiments have shown that at pressures below about 100 p.s.i., the structural integrity of the electrode pellets was inadequate. The pellets were flaky and crumbled easily. At molding pressure of 2,400 p.s.i., the electrodes possessed adequate structural integrity. A capacitor assembled with a pair of electrodes molded at 4,000 p.s.i. exhibited a capacity of 4.32 farads and a resistance of only 0.090 ohm. Electrodes molded at higher pressures showed a higher capacity and higher resistance. A capacitor constructed from electrodes molded at 45,000 p.s.i. had a capacity of 6.1 farads and a resistance of 0.120 ohm. Another capacitor which utilized a pair of electrodes molded at 80,000 p.s.i. exhibited a capacity of 6.8 farads and 0.150 ohm of resistance. From a practical standpoint of view, it is doubtful that molding pressures of 100,000 p.s.i. would be exceeded.

A pair of electrodes thus produced are placed within a separate annular member 14 which is affixed to a circular plate 12. A separator membrane saturated with the electrolyte is interposed between the two electrodes and this capacitor cell is disposed on a lower platen of a press. The upper platen is brought down upon the cell until the surfaces make contact and a concentric ring is slipped over the cell. At this point, the capacitor cell is confined by the upper platen, the lower platen, and the concentric ring. The cell is then compressed at a pressure sufficient to render the cell a coherent structure. Pressure of the order of about 2,000 p.s.i. has been found sufficient.

EXAMPLE I

Figure 1:
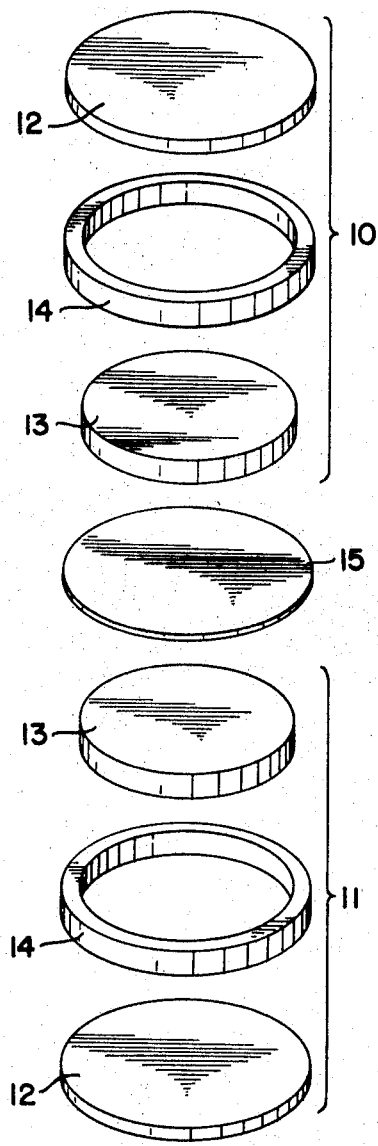
Figure 2:
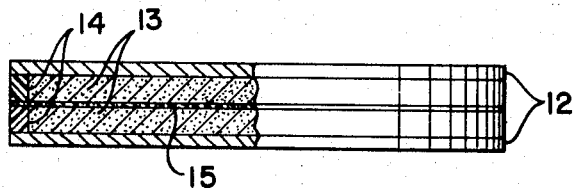
FIG. 2 shows an assembled capacitor cell. Identical reference numerals to those used in FIG. 1 denote corresponding components of the cell.
Figure 3:
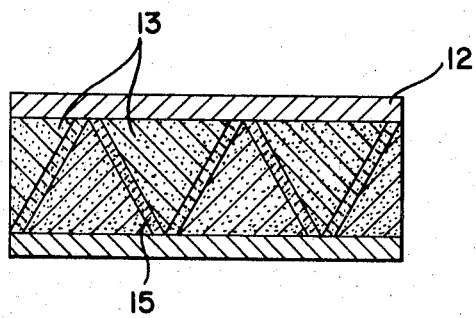
FIG. 3 illustrates another embodiment of the capacitor which utilizes elongated carbon paste electrodes which are triangular in cross-section. Same reference numerals, as in FIG. 1, are used to denote corresponding parts.

A slurry was prepared by mixing 2.6 grams of 30 percent $H_2SO_4$, 15.0 grams of water, and 2.0 grams of activated carbon particles[1] meeting the following specifications:

Color—black.
Odor—none.
Taste—none.
Fineness:
  Thru 100 mesh—91–99.
  Thru 200 mesh—70–90.
  Thru 325 mesh—50–75.
Density, lbs. cu./ft.—15–17.
Surface area, B.E.T. (meters$^2$/g.)—700–950.
Pore volume (cc./g.)—0.8.
Iodine value—90–96.
Water solubles—3% maximum.
Total ash—6% maximum.
Moisture—3% maximum when packed.
Typical pore area distribution:
  <20 A.—512.
  20–30 A.—115.
  30–40 A.—77.
  40–50 A.—36.
  50–60 A.—9.0.
  60–80 A.—7.5.
  80–100 A.—1.9.
  100–120 A.—5.4.

A paste was obtained by drying the slurry until 15.0 grams of water were removed. 0.25 gram of the paste was weighed out, placed in a die and the die was disposed under a ram. The carbon paste was compressed to 20,000 p.s.i., and in the process of compressing the paste, a couple of drops of electrolyte were squeezed out. The gasket was stamped out of a sheet of ethylene-propylene elastomer and cemented by means of an acrylic resin adhesive to a circular sheet or disk of a flexible graphite material. The gasket had the dimensions of 0.0156 inch in thickness, 0.75 inch I.D., and 1.00 inch O.D. The circular sheet material served the function of an electronic conductor and an ionic insulator. It was stamped out of a flexible graphite tape having highly directional properties and was 0.005 inch in thickness and 1.00 inch in diameter.

The electrode pellet was placed into the cavity created by the gasket and the graphite disk. Any portion of the electrode protruding above the gasket was shaved off so that the electrode pellet was flush with the gasket.

A pair of such electrode assemblies was prepared. A regenerated cellulose membrane was soaked in 30 percent $H_2SO_4$ for 15 minutes and interposed between a pair of the electrode assemblies to form a cell. The membrane served the function of electronically insulating the opposed electrodes. Its dimensions were 0.001 inch in thickness and 1.00 inch in diameter. The particular membrane material used was a thin-walled cellulose membrane.

The cell was then placed under a ram and compressed to 2,000 p.s.i., a pressure sufficient to render the cell a compact unit. Electrical connections to the upper and lower platens enabled determination of the following variables at charging voltage of 1 volt:

Capacity—6.0 f.
Resistance—0.1 ohm.
Leakage current—3.5 ma.
Volume of carbon material—0.016 inch$^3$.

The capacitor cell was then packaged by inserting it in a 1 inch I.D. phenolic tube. Since it is cumbersome to affix a lead wire to graphite disk, a 40-mesh copper screen, having a soldered copper wire lead extending outwardly, was cemented to the graphite disks by means of a conducting silver epoxy cement. A 1.00 inch O.D., 0.0625 inch in thickness polymethylmethacrylate insulating disk, with an opening in the center, was slipped over the lead wire and pressed against the copper screen at both ends of the capacitor cell. Both ends were then coated with an epoxy resin to completely encapsulate the capacitor cell. The polymethylmethacrylate disk served to provide structural rigidity and otherwise prevented the electrode material from bulging out.

It is possible to reduce the 3.5 ma. leakage current to a value of 0.1 ma. or less by coating the graphite disks with a noble metal or colloidal graphite in a solvent, such as alcohol. The purpose of this operation is to render the graphite disk more impermeable to the electrolyte. This procedure can be utilized with disks made from other similarly suitable materials.

EXAMPLE II

A capacitor cell was constructed as in Example I, with the exception that the 30 percent $H_2SO_4$ electrolyte was omitted from the carbon paste preparation. Some water was retained in the electrode pellet after pressing for the purpose of maintaining the electrode material coherent. When charged to a potential of 1 volt, the cell gave the following results:

Capacity—2.3 f.
Resistance—0.85 ohm.
Leakage current—3.5 ma.

Above data confirms the necessity of providing electrolyte within the electrode structure. As is evident from above data, the electrodes molded without electrolyte are unacceptable because of high resistance.

In another experiment identical to Example II, the resistance was 0.36 ohm initially, however, it increased to 0.65 ohm after 16 hours. The rise in resistance points to the fact that the electrolyte slowly diffused from the separator into the carbon structure. Since now there was less electrolyte in the separator, the conductivity decreased and the resistance increased.

EXAMPLE III

A capacitor cell was assembled as in Example I with the exception that a dry membrane was used. The cell was charged to 1 volt and data below was obtained:

|  | Run I | Run II |
|---|---|---|
| Capacity | 4.8 f. | 5.2 f. |
| Resistance | 0.175 ohm | 0.250 ohm. |
| Leakage current | 3.5 ma. | 3.5 ma. |

---

[1] Carbon material meeting above specifications can be obtained from West Virginia Pulp and Paper Company.

Although the capacity was somewhat lower and the internal resistance substantially higher, there is no reason why capacitors using dry membrane separators cannot be or should not be constructed. There seems to be an adequate amount of electrolyte in the electrodes to permeate the membrane separator. It is desirable to provide a slight excess of electrolyte in the carbon paste electrodes when the capacitor is assembled with a dry membrane separator.

EXAMPLE IV

The following data was obtained on a cell constructed in accordance with Example I with the exception that the cell was charged to 1.5 volts, instead of 1 volt:

Capacity—9.28 f.
Resistance—0.145 ohm.
Leakage current—20 ma.

As was expected with the higher voltage, greater capacity was obtained with an undesirable increase in leakage current.

EXAMPLE V

To achieve higher voltages per cell, it is necessary to employ nonaqueous electrolytes because of their higher decomposition potentials. A one-cell capacitor was assembled, as previously described in Example I, using glass fiber filter paper and a 40–60 volume percent mixture of saturated tetraethyl ammonium p-toluene sulfonate in dimethyl formamide. The following results were achieved:

Voltage—2.5 volts.
Capacity—2.5 farads.
Resistance—0.44 ohm.

It has been stated that the capacitor of this invention is limited to low voltages. This is believed to be true because the electrolytes are aqueous solutions and the decomposition potential of water is below 2 volts. Higher voltages per cell are attainable with nonaqueous electrolytes, as has been demonstrated in Example V. The principle of this invention, however, is well adapted to use in capacitors requiring high voltage ratings. This result is achieved by stacking a plurality of capacitor cells in series.

EXAMPLE VI

A capacitor consisting of six cells was assembled. Each cell was constructed as in Example I, except that a gasket was cemented to both sides of the five intermediate graphite disks and only to the inwardly facing sides of the terminal graphite disks. This capacitor possessed the following characteristics:

Capacity—1 f.
Resistance—0.6 ohm.
Leakage current—1 ma.
Volume of carbon material—0.0825 inch$^3$.
Voltage—6 volts.

The six-cell capacitor has been packaged in the same manner as described in Example I. It has endured over 500 charge-discharge cycles over a three-week period.

EXAMPLE VII

To demonstrate capability of the paste electrode to achieve an acceptable merit factor ($ZV/E^2$), a three-cell carbon paste electrode was assembled in the manner previously described. The carbon paste consisted of 2.5 parts by weight of 30 percent $H_2SO_4$ and 1 part by weight of an activated carbon of vegetable origin. The electrodes were prepressed with a pressure of 6,000 p.s.i. The capacitor cells were assembled in series and subjected to a pressure of 1,280 p.s.i. Results are indicated below:

Capacity—3.1 farads.
Resistance—0.098 ohm.
Voltage—3 volts.
Leakage current—4.4 ma.
$ZV/E^2$ factor—0.0013.

There are many applications which require a capacitor with a quick-charge feature. The paste electrode capacitor can be charged in less than 5 seconds. The charging time can further be reduced by reducing the resistance.

Although in the case of prior art capacitors impedance rises with frequency, this is not so for the paste electrode capacitor. Experiments have shown that in the frequency range of 500–50,000 c.p.s., impedance is essentially frequency independent, while in the frequency range of 0.5–500, impedance increases with frequency. At frequencies above 50,000 c.p.s., the behavior of the impedance will depend, at least in part, on the manner in which the capacitor is packaged. The essentially frequency independent impedance characteristic of the herein described capacitor obviates the necessity of providing a second low capacitance capacitor in parallel to shunt the first capacitor and thus prevent impedance increase with rising frequencies.

Capacitance of the herein described capacitor is temperature dependent. A six-cell capacitor, which exhibited an initial capacity of 1.75 farads at 20° C., had a capacity of 1.05 farads at −20° C.

The object of the foregoing disclosure was to describe the invention in principle. The invention as disclosed is not intended to be limited to the particular embodiments described and illustrated. The electrodes and other components of the capacitor can be manufactured in other shapes and sizes. The specific configuration of the electrodes and the other components of the capacitor can be determined by a man skilled in the art as dictated by the requirements of a particular application.

I claim:

1. An electrolytic capacitor comprising a housing, at least one pair of spaced carbon paste electrodes in said housing, said electrodes being self-supporting bodies compressed from a viscous paste of carbon particles and an electrolyte, and an ionically conductive separator means between and in contact with said electrodes electronically separating said electrodes from each other.

2. Capacitor of claim 1 wherein said carbon paste electrodes comprise activated carbon material having a surface area in the range of 100—2000 meters$^2$/g., admixed with said electrolyte.

3. Capacitor of claim 2 wherein the surface area of said activated carbon material is in the range of 500–1500 meters$^2$/g.

4. Capacitor of claim 1 wherein said separator is a porous separator saturated with an electrolyte.

5. Capacitor of claim 4 wherein said saturated porous separator includes a wetting agent facilitating saturation of said separator with said electrolyte.

6. Capacitor of claim 1 including an electrically conducting member on the surface of each of said electrodes facing away from the separator-contact surface, said member functioning as a current collector and as an impervious barrier to the passage of said electrolyte.

7. Capacitor of claim 6 including an annular insulating flexible means for confining the periphery of said electrodes held captive by said member.

8. The capacitor of claim 6 wherein the assembly of the component parts is compressed under a pressure of about 2000 p.s.i. to render said capacitor a compact unit.

9. An electrolytic capacitor comprising a plurality of cells connected in series, each cell consisting essentially of a pair of self-supporting carbon paste electrodes, an ionically conducting separator means interposed between and electronically separating said electrodes, and a conducting member functioning as a current collector and as an impervious barrier to the passage of said electrolyte disposed between said cells, each of said electrodes consisting essentially of a mixture of activated carbon material having a surface area in the range of 100–2000 meters$^2$/g. and an electrolyte in an amount sufficient to impart to said mixture a consistency of a viscous paste.

10. Capacitor of claim 9 wherein said separator is saturated with said electrolyte and said activated carbon material has a surface area in the range of 500–1500 meters$^2$/g.

11. Capacitor of claim 9 including an insulating flexible annular means held captive by said members for confining periphery of said electrodes.

12. An electrical storage device comprising a housing, at least one pair of carbon paste electrodes consisting essentially of a mixture of activated carbon material and an electrolyte in an amount sufficient to impart to said mixture a consistency of a a viscous paste, and an ionically conductive separator means interposed between said electrodes for the purpose of insulating said electrodes from each other.

13. Device of claim 12 wherein product of its impedance and volume divided by voltage squared is less than 0.0015.

14. Device of claim 12 including a member on the backside of each of said electrodes functioning as a current collector and as an impervious barrier to the passage of said electrolyte.

15. Device of claim 14 wherein said separator is a porous separator saturated with said electrolyte and said carbon material has a surface area in the range of 100–2000 meters$^2$/g.

16. Device of claim 15 wherein said carbon material has a surface area of 500–1500 meters$^2$/g.

References Cited

UNITED STATES PATENTS

| | | | |
|---|---|---|---|
| 2,005,279 | 6/1935 | Van Geel et al. | 317—233 X |
| 2,299,667 | 10/1942 | Waterman | 317—230 |
| 2,800,616 | 7/1957 | Becker | 317—230 |
| 3,288,641 | 11/1966 | Rightmire | 317—231 |

JAMES D. KALLAM, Primary Examiner

U.S. Cl. X.R.

136—6